United States Patent [19]

Reitmeier

[11] 4,355,324

[45] Oct. 19, 1982

[54] SAMPLED OR DIGITIZED COLOR IN A HIGH SPEED SEARCH RECORD AND REPLAY SYSTEM

[75] Inventor: Glenn A. Reitmeier, Trenton, N.J.

[73] Assignee: RCA Corporation, New York, N.Y.

[21] Appl. No.: 163,150

[22] Filed: Jun. 26, 1980

[30] Foreign Application Priority Data

Mar. 3, 1980 [GB] United Kingdom ............. 8007163
Mar. 6, 1980 [GB] United Kingdom ............. 8007669

[51] Int. Cl.³ ........................................ H04N 5/79
[52] U.S. Cl. .................................. 358/312; 358/12; 358/334; 360/22
[58] Field of Search ................ 358/12, 13, 22, 9; 360/22, 23, 32, 33

[56] References Cited

U.S. PATENT DOCUMENTS

| | | | |
|---|---|---|---|
| 3,560,635 | 2/1971 | Bruch | 358/9 |
| 3,975,764 | 8/1976 | Kobayashi et al. | 360/33 X |
| 4,134,128 | 1/1979 | Hurst | 358/22 |
| 4,204,227 | 5/1980 | Gurley | 358/13 X |
| 4,282,546 | 8/1981 | Reitmeier | 358/22 |

FOREIGN PATENT DOCUMENTS 2708672 8/1978 Fed. Rep. of Germany ........ 360/23

Primary Examiner—Stuart N. Hecker
Attorney, Agent, or Firm—Eugene M. Whitacre; William H. Meise; Henry I. Steckler

[57] ABSTRACT

Moviola color picture quality is improved for a record and replay system wherein video sampled at a predetermined multiple of the color subcarrier frequency is recorded with each frame or field being disposed on a set of multiple tracks and with only a portion of the recorded information being intended for replay to reconstruct the color Moviola signal. Only pixel groups relating to entire color subcarrier cycles are recorded on the tracks so that a video signal having proper color information can be readily reconstructed therefrom during the Moviola mode. In one preferred embodiment, sequential color subcarrier cycle pixel groups are recorded on separate tracks with those to be replayed during the Moviola mode on a single track so that Moviola pixel groups on the single track can be repeated in sequence when reconstructing the Moviola picture and thereby supply instantaneously coherent information.

17 Claims, 10 Drawing Figures

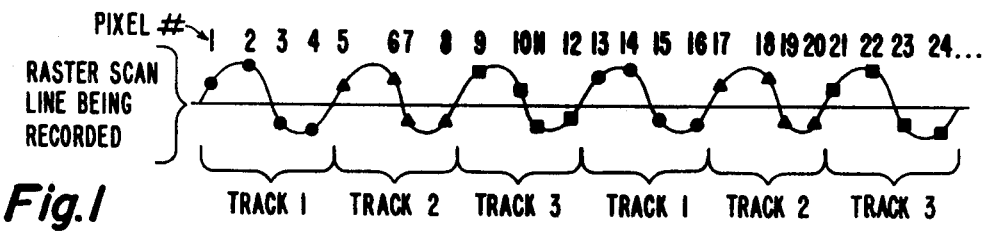
Fig. 1
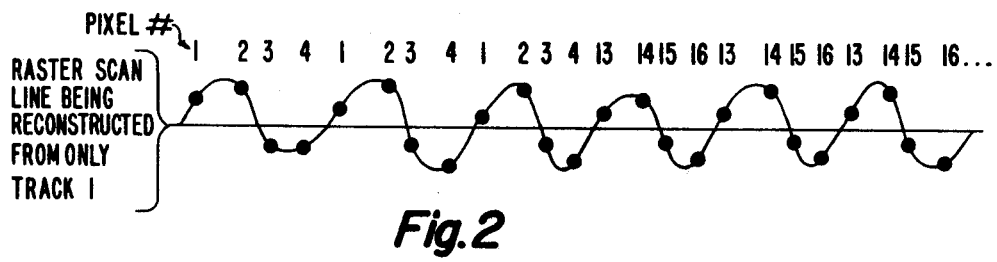
Fig. 2
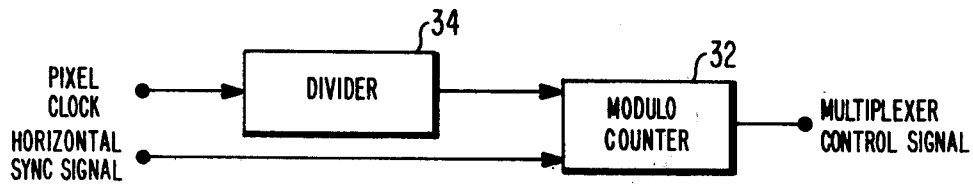
Fig. 5
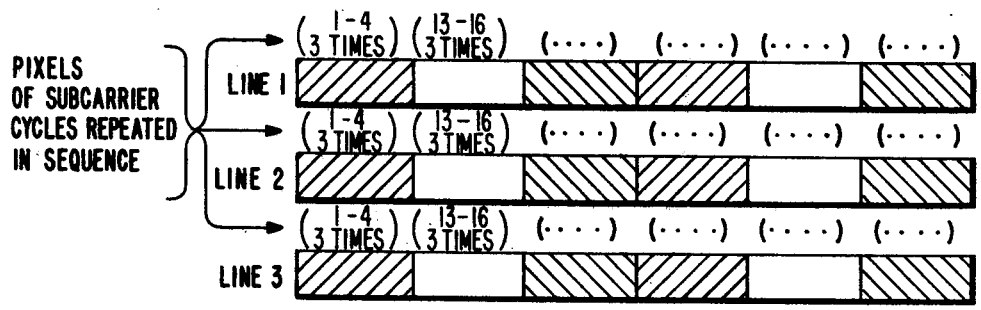
Fig. 6
Fig. 7

TRACK 1  1 2 3 4 13 14 15 16...5 6 7 8 17 18 19 20...9 10 11 12 21 22 23 24...
TRACK 2  5 6 7 8 17 18 19 20...1 2 3 4 13 14 15 16...5 6 7 8 17 18 19 20...
TRACK 3  9 10 11 12 21 22 23 24...9 10 11 12 21 22 23 24...1 2 3 4 13 14 15 16...
|← LINE 1 →|← LINE 2 →|← LINE 3 →|
*Fig. 8*
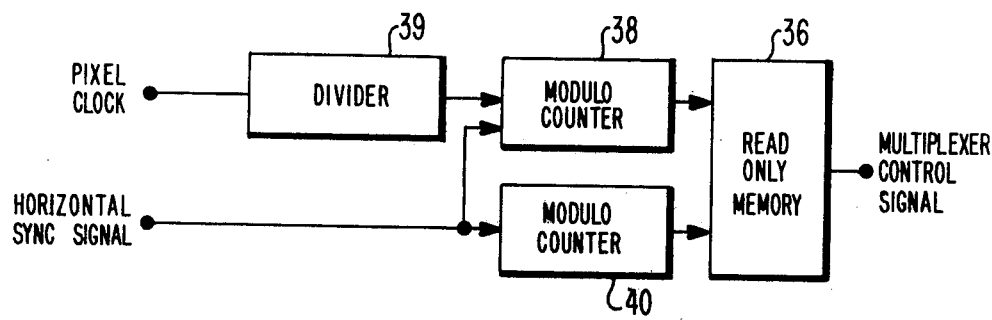
*Fig. 9*
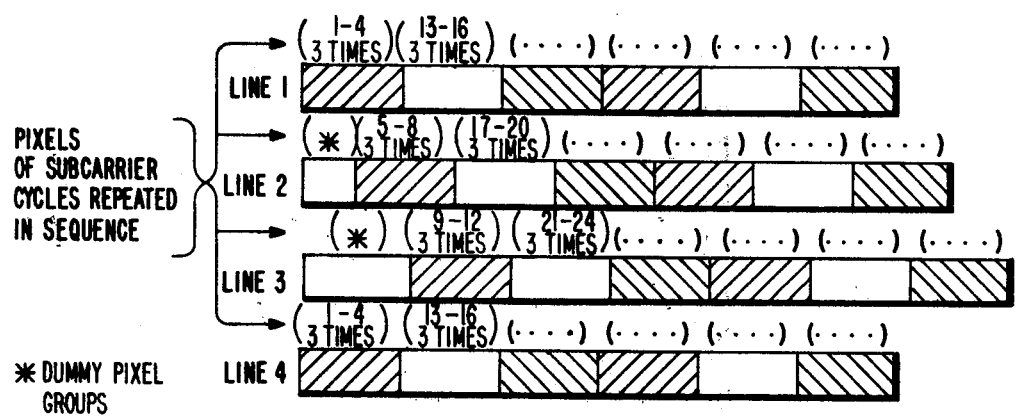
*Fig. 10*

SAMPLED OR DIGITIZED COLOR IN A HIGH SPEED SEARCH RECORD AND REPLAY SYSTEM

BACKGROUND OF THE INVENTION

This invention relates to a proposed color video sampled or digitized record and replay system wherein each video frame or field is recorded on a set of multiple tape tracks. During the search or Moviola mode of this system, the recorded medium is replayed at very high tape speed and a color video signal relating to a frame or field of reduced quality is reconstructed from only a portion of the information recorded for many frames or fields. Although conventional techniques could be adapted in this system for operating in the Moviola mode, the Moviola picture resulting from these techniques would be of poor quality.

SUMMARY OF THE INVENTION

To improve the moviola picture quality, only entire color subcarrier cycles are recorded on the tracks in the record and replay system of this invention so that a video signal can be reconstructed with proper color information. In one preferred embodiment, groups of picture samples (pixels) relating to sequential subcarrier cycles are recorded on separate tape tracks in the multiple track set with those pixel groups to be utilized for reconstruction of the video signal during the Moviola mode being recorded on a single track and being repeated in sequence a number of times to derive filler information for the other tracks. A convenient arrangement for recording a color video signal in accordance with this invention includes a buffer memory for each track and a multiplexer through which groups of pixels relating to entire color subcarrier cycles are directed in sequence to the buffer memories. Then pixel information is stored in the buffer memories during each cycle of the multiplexer and simultaneously read out to the tracks at the completion of each multiplexer cycle. A convenient arrangement for replaying a Moviola signal in accordance with this invention includes a converter for presenting color subcarrier cycle pixel groups individually from a single track in parallel format with each pixel available from a separate output. A multiplexer having the outputs from the converter applied thereto, is repeatedly cycled to pass each Moviola pixel group a number of times equal to the number of tracks in the multiple track set and thereby provide instantaneously coherent information during moviola replay.

BRIEF DESCRIPTION OF THE DRAWINGS

FIG. 1 illustrates the general concept of the invention for a single raster scan line that is recorded in three tape tracks;

FIG. 2 illustrates one replay technique for reconstructing the raster scan line of FIG. 1 from a single track during the Moviola mode;

FIG. 5 illustrates one embodiment of the invention wherein comparable color subcarrier cycles from each scan line in a raster are recorded in the same order on the tracks;

FIG. 6 illustrates one arrangement of the format selector means in FIG. 3 for the tape format of FIG. 5;

FIG. 7 illustrates the vertical alignment of raster segments that is obtained when the raster scan lines of FIG. 3 are replayed using the same technique as illustrated in FIG. 2;

FIG. 8 illustrates another embodiment of the invention wherein comparable color subcarrier cycles from adjacent scan lines in a raster are recorded on the tracks in a different order;

FIG. 9 illustrates another arrangement of the format selector means in FIG. 3 for the tape format of FIG. 8; and FIG. 10 illustrates the diagonal alignment of raster segments that is obtained when another replay technique is utilized to reconstruct the raster scan lines of FIG. 8.

DESCRIPTION OF THE PREFERRED EMBODIMENTS

Figure 3:
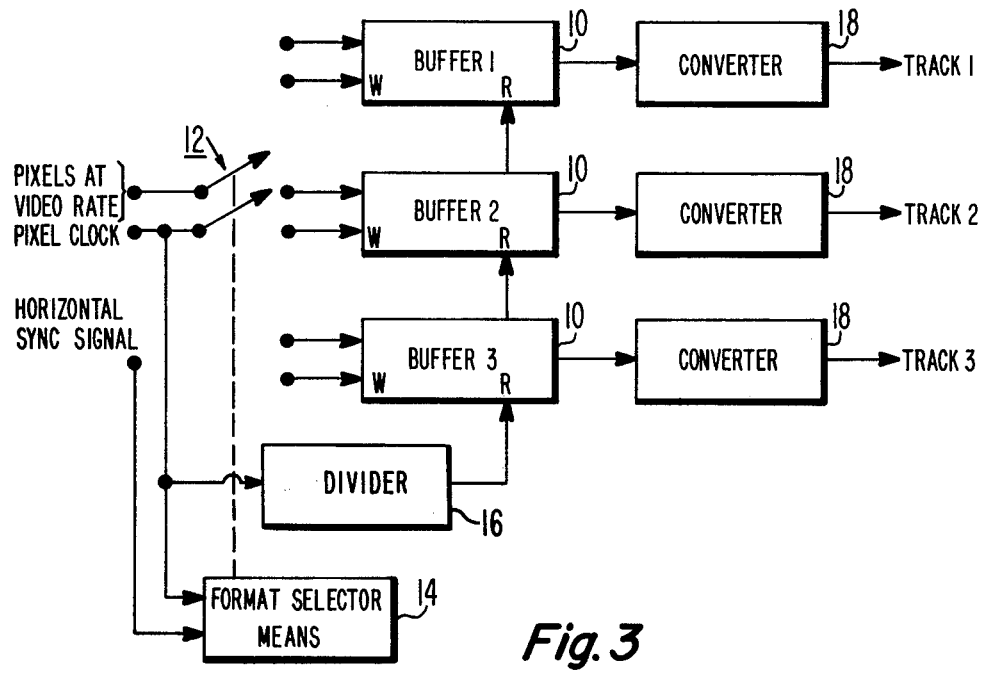
FIG. 3 illustrates a formating means with which tape formats can be recorded in a recording system of this invention.

In sampled or digital color video record and replay systems where a set of multiple tracks is used to record each raster frame or field, the very high speed of the recorded medium during the live search or Moviola mode requires that a video signal be reconstructed from only a portion of the recorded information. For one such proposed system the recorded video signal is digitized by sampling it at some predetermined multiple of its color subcarrier frequency. Conventional techniques are utilized in this proposed system to replay Moviola information from only a single track while the recorded medium moves at the elevated speed, such as to record the moviola track with a head having an azimuth angle gap and to replay it with a corresponding type but oversized head. Because the Moviola picture is replayed from only a portion of the recorded information, only a picture of reduced quality is possible from such record and replay systems during the Moviola mode. Furthermore, the replayed Moviola raster contains increments from many recorded frames or fields due to the difference in the speed of the recorded medium during the record and moviola modes. However, the moviola picture quality is greatly enhanced in the record and replay system of this invention wherein only picture sample (pixel) groups relating to entire color subcarrier cycles are recorded on the individual tracks from which a video signal having proper color information is readily reconstructed by replaying a portion of those color subcarrier cycle pixel groups during the moviola mode.

As will be discussed hereinafter, conventional digital hardware is readily available from which to construct formating means for directing only pixel groups of entire color subcarrier cycles either to the tracks when recording, or from the tracks when replaying. Since the Moviola mode is most commonly found in systems having both record and replay capabilities, both record and replay formating means will generally be discussed for a record and replay system of the invention. However, those skilled in the art will realize without any further explanation that the record and replay functions could be performed by separate and distinct subsystems with a record formating means in accordance with the invention being found in one subsystem, a replay formating means in accordance with the invention being found in the other subsystem, and a tape format in accordance with the invention being recorded in one subsystem and replayed in the other subsystem.

One preferred tape format for use in the record and replay system of this invention is illustrated in FIG. 1 where pixel groups relating to sequential color subcarrier cycles of a single raster scan line are recorded on separate tracks in the multiple track set. For purposes of discussion only, four pixels are taken during each color subcarrier cycle and three tracks are included in the multiple track set. Therefore, the first four pixels that are represented by dots, relate to the first color subcarrier cycle and are recorded on track 1; the second four pixels that are represented by triangles, relate to the second color subcarrier cycle and are recorded on track 2; the third four pixels that are represented by squares, relate to the third color subcarrier cycle and are recorded on track 3; with this same format reoccurring for each sequence of three color subcarrier cycles until the complete raster scan line has been recorded. Then during Moviola replay, the video signal for this raster scan line is reconstructed from only a portion of the recorded color subcarrier cycle pixel groups, for example pixel groups from only one of the three tracks as will be discussed further hereinafter. However, the color information is preserved because that reconstruction is accomplished with entire color subcarrier cycles and therefore, the resulting picture quality is improved relative to that attainable with conventional recording systems.

Without any further explanation, it should be readily understood by those skilled in the art that the color subcarrier cycle pixel groups for all the raster scan lines in each frame or field would be recorded in the record and replay system of this invention. Furthermore, the track order in which the sequential color subcarrier cycle pixel groups are recorded in FIG. 1 is not a limitation to the record and replay system of this invention and in fact, other track orders have been utilized to obtain better Moviola replay results as will be discussed hereinafter.

When reconstructing a normal video signal for the raster scan line of FIG. 1, all of the recorded color subcarrier cycle pixel groups are replayed in their recorded sequence from the tracks in the multiple track set. During the Moviola mode however, the video signal for that raster scan line must be reconstructed from only a portion of the recorded color subcarrier cycle pixel groups with instantaneously coherent information being derived from each such pixel group for display as a segment of the Moviola raster. Although the portion of the color subcarrier cycle pixel groups to be replayed during the Moviola mode could be dispersed over all the tracks of the multiple track set within the concept of this invention, such pixel groups are recorded on a single Moviola track of the multiple track set in one convenient tape format, such as track 1 in the tape format of FIG. 1. Then the instantaneously coherent information for display as a segment of the Moviola raster is derived by repeating each moviola color subcarrier cycle pixel group a number of times equal to the number of tracks in the multiple track set. For example, the pixel groups relating to the first and fourth color subcarrier cycles in the raster scan line of FIG. 1 are repeated three times in sequence when utilizing this replay technique, as illustrated by FIG. 2. Of course, any number X of tracks may be utilized in the multiple track set and any number Y of pixels may be taken for each color subcarrier cycle in the record and replay system of this invention. Therefore, this replay technique generally applies for the record and replay system of this invention by repeating X times each group of Y pixels that relates to a Moviola color subcarrier cycle on the moviola track.

One preferred formating means for directing only pixel groups of entire subcarrier cycles to the individual tracks when recording is shown in FIG. 3. Sequential color subcarrier cycle pixel groups representing each frame or field of the video signal are distributed to the multiple track set through individual buffer memories 10 for each track in the multiple track set. A multiplexer 12 is cycled to apply a pixel clock as a write clock and the color subcarrier cycle pixels to each buffer memory 10 in a sequence established by a record format selector means 14 for controlling the multiplexer 12 to determine the entry order into the buffer memories 10 of the sequential pixel groups. The color subcarrier cycle pixel groups are stored in the buffer memories 10 during each cycle of the multiplexer 12 and simultaneously read out to the tracks at the completion of each multiplexer cycle when the pixel clock is applied as a read clock through a frequency divider 16 which divides by a number equal to the number of tracks in the multiple track set. The horizontal sync signal and the pixel clock are applied to drive the format selector means 14. Color subcarrier cycle pixel groups may be processed through the record formating means in either serial or parallel digital word form, with individual parallel to serial converters 18 being utilized to pass the output of each buffer 10 when a parallel digital word form is utilized.

During normal reconstruction of a video signal from the multiple track set, all of the color subcarrier cycle pixel groups recorded on the tracks are processed through a replay formating means of identical but inverse structure to that of the record formating means. Therefore, such a replay formating means would direct the color subcarrier cycle pixel groups from the tracks to a parallel arrangement of buffer memories through serial to parallel converters when necessary and from the buffer memories to display circuitry through a multiplexer under the overall control of a format selector means. During Moviola reconstruction of a video signal however, the nature of the replay formating means depends on the distribution of the moviola color subcarrier cycle pixel groups in the multiple track set. Furthermore, instantaneously coherent information must be derived from each Moviola color subcarrier cycle pixel group replayed. Consequently, a record and replay system which derives such information with the previously discussed color subcarrier cycle pixel group replication technique would include a replay formating and replication means for directing the moviola color subcarrier cycle pixel groups from the multiple track set and repeating each such color subcarrier cycle pixel group during replay to provide information.

Figure 4:
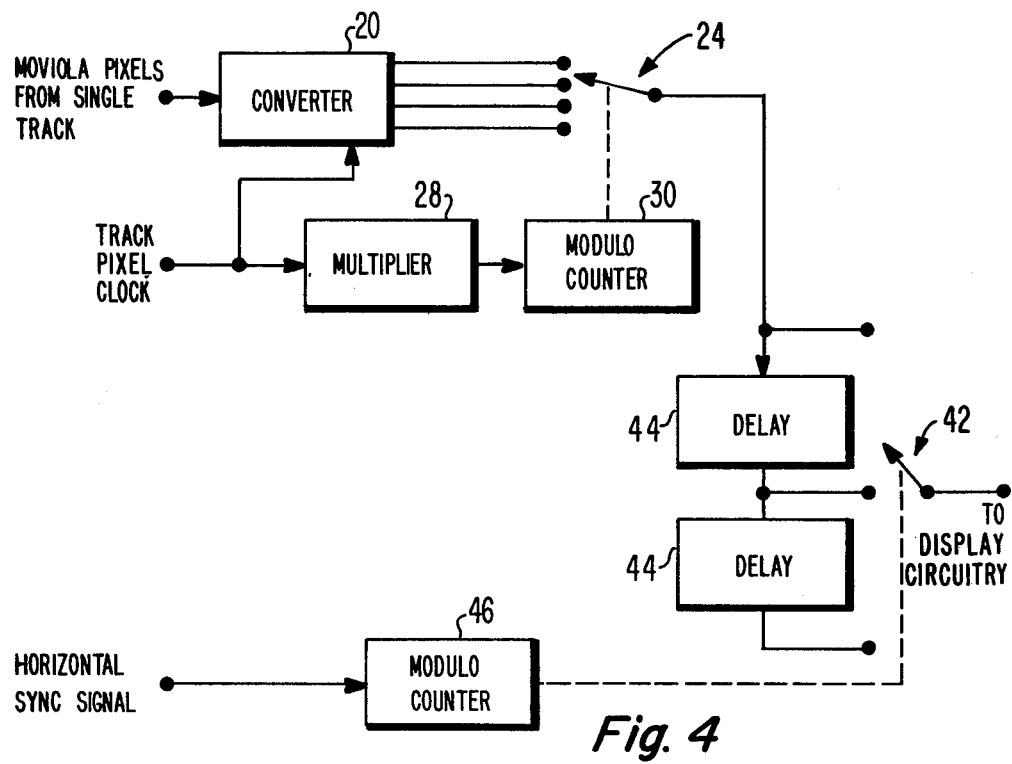
FIG. 4 illustrates a formating and replication means with which tape formats can be replayed in the recording system of the invention.

When the video signal is reconstructed from a single track during the Moviola mode in the manner discussed previously relative to FIG. 2, such a replay formating and replication means could be structured as shown in FIG. 4. A format converter 20 is disposed in this arrangement to present each moviola color subcarrier cycle pixel group on the Moviola track in parallel format with each pixel being available from a separate output. A multiplexer 24 having the outputs from the format converter 20 applied thereto, is repeatedly cycled to pass each moviola color subcarrier cycle pixel group a number of times equal to the number of tracks in the multiple track set. Depending on the desired video display format, the output from the multiplexer 24 may be passed directly to the display circuitry as will be discussed further hereinafter. A track pixel clock is applied to the converter 20 to sequence the color subcarrier cycle pixel groups therethrough and it is also applied to control the multiplexer 24 through a series arrangement of a frequency multiplier 28 equal to the number of tracks in the multiple track set and a modulo counter 30 having a count equal to the number of pixels in each color subcarrier cycle pixel group.

A particular tape format for the record and replay system of the invention is illustrated in FIG. 5 wherein corresponding color subcarrier cycle pixel groups from each scan line of a raster are recorded in the same order on the tracks of the multiple track set. For purposes of discussion only, the number of pixels in each group relating to each color subcarrier cycle and the number of tracks in the multiple track set, are the same as those previously selected for the single raster scan line recorded in FIG. 1. Therefore, pixels 1–4 relating to the first color subcarrier cycle in each raster scan line are recorded on track 1; pixels 5–8 relating to the second color subcarrier cycle in each raster scan line are recorded on track 2; pixels 9–12 relating to the third color subcarrier cycle in each raster scan line are recorded on track 3; pixels 13–16 relating to the fourth color subcarrier cycle in each raster scan line are also recorded on track 1; pixels 17–20 relating to the fifth color subcarrier cycle in each raster scan line are also recorded on track 2; pixels 21–24 relating to the sixth color subcarrier cycle in each raster scan line are also recorded on track 3; and so on until the color subcarrier cycle pixel groups in all the raster scan lines are recorded.

The record formating means or the replay formating and replication means illustrated in FIGS. 3 and 4 respectively, may be utilized with the tape format of FIG. 5. As shown in FIG. 6, the format selector means 14 in the record formating means of FIG. 3 would then include a modulo counter 32 and a frequency divider 34. The modulo counter 32 would have a count equal to the number of tracks in the multiple track set and the output therefrom would be applied as the multiplexer control signal in FIG. 3. Output from the divider 34 would be applied to the incrementing input of the modulo counter 32 and it would divide the pixel clock rate by the number of pixels in each color subcarrier cycle pixel group while the horizontal sync signal would be applied to the reset input of the modulo counter 32. Consequently, output from the modulo counter 32 in FIG. 6 advances the multiplexer 12 in FIG. 3 to a new buffer memory position for each series of pixel clock pulses equal in duration to the duration of a color subcarrier cycle pixel group and returns the multiplexer 12 to the first buffer memory after each horizontal sync pulse. As discussed previously, the replay formating and replication means of FIG. 4 reconstructs the moviola video signal from color subcarrier cycle pixel groups on a single track. Those pixel groups are each separated into their individual pixels at the outputs of converter 20 and then repeated for display by the multiplexer 24 which the modulo counter 30 cycles a number of times equal to the number of tracks in the multiple track set for each pixel group. Assuming that track 1 of the FIG. 5 tape format is utilized for such Moviola replay, a video signal for a full color picture will be reconstructed from color subcarrier cycle pixel groups 1–4 and 13–16 in each raster scan line as shown by the replay format of FIG. 7 where each pixel group is repeated three times in sequence to supply the instantaneously coherent information for display as a segment of the moviola raster. Since pixel groups relating to corresponding color subcarrier cycles in each raster scan line are recorded in the same tracks of the FIG. 5 tape format however, corresponding picture segments produced by repeating the Moviola color subcarrier cycle pixel groups will be aligned in a vertical pattern. Although the resulting moviola picture will be of improved quality as discussed previously, the vertical pattern will limit its quality due to restricted horizontal resolution which causes color striping.

This vertical pattern can be avoided by using another tape format for the record and replay system of this invention wherein the corresponding color subcarrier cycle pixel groups in adjacent raster scan lines are recorded on separate tracks in the multiple track set, as shown in FIG. 8. For purposes of discussion only, the number of pixels in each group relating to each color subcarrier cycle and the number of tracks in the multiple track set, are the same as those previously selected for the single raster scan line recorded in FIG. 1. Therefore, raster scan line 1 is recorded with its pixel groups 1–4, 13–16, etc., on track 1; its pixel groups 5–8, 17–20, etc., on track 2; its pixel groups 9–12, 21–24, etc., on track 3; while raster scan line 2 is recorded with its pixel groups 5–8, 17–20, etc., on track 1; its pixel groups 1–4, 13–16, etc., on track 2; its pixel groups 9–12, 21–24, etc., on track 3; and raster scan line 3 is recorded with its pixel groups 9–12, 21–24, etc., on track 1; its pixel groups 5–8, 17–20, etc., on track 2; its pixel groups 1–4, 13–16, etc., on track 3.

The tape format of FIG. 8 may be recorded through the record formating means of FIG. 3 wherein the format selector means 14 would then control the multiplexer 12 through a read only memory 36, as shown in FIG. 9. Outputs from two modulo counters 38 and 40 are applied to advance the read only memory 36 through its program which is established to record corresponding color subcarrier cycle pixel groups in adjacent raster scan lines on separate tracks of the multiple track set. Each modulo counter 38 and 40 has a count equal to the number of tracks in the multiple track set and the horizontal sync signal is applied to the incrementing input of modulo counter 40 and to the reset input of modulo counter 38. The pixel clock is applied to the incrementing input of the modulo counter 38 through a frequency divider 39 which divides by a number equal to the number of pixels in each color subcarrier cycle pixel group. Consequently, the multiplexer 12 in FIG. 3 directs the bits for a complete color subcarrier cycle pixel group to an individual buffer memory 10 for each pulse the read only memory 36 receives from the modulo counter 38 and changes the multiplexer 12 for each pulse the read only memory 36 receives from the modulo counter 40. To record the tape format of FIG. 8, the switching sequence of the multiplexer 12 is buffer memories 1, 2, 3, etc. for line 1; buffer memories 2, 1, 3, etc. for line 2; buffer memories 3, 2, 1, etc. for line 3; and a repeat of this sequencing until all the raster scan lines are recorded.

The tape format of FIG. 8 may be replayed through the replay formating and replication means of FIG. 4 with another multiplexer 42 being incorporated therein to offset the replay of each raster scan line relative to adjacent raster scan lines and thereby result in a replay format having a diagonal pattern of repeated pixel groups that do not correspond in adjacent raster scan lines, as shown in FIG. 10. The multiplexer 42 has a single output and a number of sequential inputs equal to the number of tracks in the multiple track set and those inputs are arranged from a first input to a last input. Successive inputs between the first and last inputs are interconnected through a delay 44 of a duration equal to the duration of a color subcarrier cycle and the output from the multiplexer 24 is applied to the first input. Multiplexer 42 is controlled by the horizontal sync signal which is applied through a modulo counter 46 having a count equal to the number of tracks in the multiple track set. Consequently, when the multiplexer 42 is located at its first input, the repeated pixel groups from multiplexer 24 are passed for display without delay. As the input position of multiplexer 42 is switched for each horizontal sync signal however, the display of those pixel groups is delayed by an additional color subcarrier cycle duration at each sequential input.

The replay formating and replication means of FIG. 4 then functions to reproduce the tape format of FIG. 8 in the replay format of FIG. 10 where the raster scan line 1 is displayed with pixel group 1-4 being repeated three times to fill pixel locations 1-12, pixel group 13-16 being repeated three times to fill pixel locations 13-24, and so on; raster scan line 2 is displayed with a dummy pixel group filling pixel locations 1-4 during one delay period, pixel group 5-8 being repeated three times to fill pixel locations 5-16, pixel group 17-20 being repeated 3 times to fill pixel locations 17-28, and so on; raster scan line 3 is displayed with two dummy pixel groups filling pixel locations 1-8 during two delay periods, pixel group 9-12 being repeated three times to fill pixel locations 9-20, pixel group 21-24 being repeated three times to fill pixel locations 21-32, and so on; raster scan line 4 is replayed in the same manner as raster scan line 1 and the replay format is replicated thereafter until the raster or video field is completed. The conventional edge conditions of a raster render the nature of the dummy pixel groups unimportant because many pixels at both the beginning and end of each raster scan line are not viewable. As an example, a typical raster scan line contains 910 pixels of which only 768 pixels are viewable. However, the dummy pixel groups for any raster scan line can be derived in many ways such as to use the pixel groups at the end of the immediately preceeding raster scan line or to merely leave the offset distance blank. A moviola picture of very acceptable quality results from the diagonal pattern of non-corresponding pixel groups in the replay format of FIG. 10. Those skilled in the art should understand without further explanation that other diagonal patterns of non-corresponding pixel groups are also possible as moviola replay formats which present higher quality pictures by comparison to the previously discussed replay format of FIG. 7 wherein the vertical pattern of corresponding pixel groups is provided.

What I claim is:

1. In the tape format of the type wherein digital color composite video sampled at a predetermined multiple of the color subcarrier frequency is recorded with each video frame or field being disposed on a set of multiple tracks and with only a portion of the recorded information being intended for replay to reconstruct the color video signal during the Moviola mode, the improvement comprising:

only pixel groups relating to entire color subcarrier cycles are recorded on the tracks, whereby a video signal having proper color information can be readily reconstructed therefrom during the Moviola mode.

2. The tape format of claim 1 wherein sequential color subcarrier cycle pixel groups are recorded on separate tracks in the multiple track set with those pixel groups to be replayed during the Moviola mode being recorded on a single moviola track, whereby the moviola color subcarrier cycle pixel groups on said single track can be repeated in sequence when reconstructing the video signal during the Moviola mode and thereby supply instantaneously coherent information.

3. The tape format of claim 2 wherein corresponding color subcarrier cycle pixel groups from each raster scan line are recorded in the same order on the tracks of the multiple track set so that each repeated sequence of a color subcarrier cycle pixel group from a raster scan line vertically aligns with the repeated sequence of corresponding color subcarrier cycle pixel groups from the other raster scan lines during the Moviola mode.

4. The tape format of claim 2 wherein corresponding color subcarrier cycle pixel groups in adjacent raster scan lines are recorded on separate tracks of the multiple track set, whereby dummy pixel groups may be included during the Moviola mode to offset the replay of each raster scan line relative to adjacent raster scan lines and thereby derive a replay format in which repeated sequences of non-corresponding color subcarrier cycle pixel groups in adjacent raster scan lines are aligned in a diagonal pattern.

5. In a record system of the type wherein digital color video sampled at a predetermined multiple of the color composite subcarrier frequency is recorded with each video field or frame disposed on a set of multiple tracks and with only a portion of the recorded information being intended for replay to reconstruct the color video signal during the Moviola mode, the improvement comprising:

formating means for directing only pixel groups of entire subcarrier cycles to the individual tracks when recording.

6. The record system of claim 5 wherein said record formating means includes:

a buffer memory for each track in the multiple track set;

a multiplexer through which sequential color subcarrier cycle pixel groups are separately passed to said buffer memories, said pixel groups being stored in said buffer memories during each cycle of said multiplexer and simultaneously read out to the tracks at the completion of each multiplexer cycle; and record format selector means for controlling said multiplexer to determine the entry order into said buffer memories of the sequential pixel groups.

7. The record system of claim 6 wherein said record format selector means controls said multiplexer through a modulo counter to record corresponding color subcarrier cycle pixel groups from each raster scan line in the same order on the tracks of the multiple track set, said modulo counter having a count equal to the number of tracks and having the horizontal sync signal applied to its reset input while the pixel clock is applied to its incrementing input through a divider that divides by a number equal to the number of pixels in each color subcarrier cycle pixel group.

8. The record system of claim 6 wherein said record format selector means controls said multiplexer through a read only memory programmed with the multiplexing sequence necessary to record corresponding color subcarrier cycle pixel groups in adjacent raster scan lines on separate tracks of the multiple track set, said read only memory having the horizontal sync signal applied thereto through a first modulo counter with a count equal to the number of tracks in the multiple track set and having the output applied thereto from a second modulo counter with a count equal to the number of tracks in the multiple track set, said second modulo counter having the horizontal sync signal applied to its reset input and the pixel clock applied to its incrementing input through a divider that divides by a number equal to the number of pixels in each color subcarrier cycle pixel group.

9. In a replay system of the type wherein digital color composite video sampled at a predetermined multiple of the color subcarrier frequency is recorded with each video field or frame disposed on a set of multiple tracks and with only a portion of the recorded information being intended for replay to reconstruct the color video signal during the Moviola mode, the improvement comprising:

replay formating and replication means for directing moviola entire color subcarrier cycle pixel groups from the multiple track set and repeating each moviola color subcarrier cycle pixel group a number of times to provide instantaneous coherent information during the Moviola mode.

10. The replay system of claim 9 wherein sequential color subcarrier cycle pixel groups are recorded on separate tracks in the multiple track set with corresponding color subcarrier cycle pixel groups from each raster scan line being recorded in the same order on the tracks of the multiple track set; and wherein only those pixel groups on a single track are processed through said Moviola replay formating and replication means which includes:

a format converter to present the Moviola color subcarrier cycle pixel groups on said single track in parallel format with each pixel being available from a separate output; and a multiplexer to which the outputs from said format converter are applied, said multiplexer being cycled to repeatedly pass each Moviola color subcarrier cycle pixel group a number of times equal to the number of tracks in the multiple track set so that upon being displayed each repeated sequence of a color subcarrier cycle pixel group from a raster scan line is vertically aligned with the corresponding repeated sequence of color subcarrier cycle pixel groups from the other raster scan lines.

11. The replay system of claim 9 wherein sequential color subcarrier cycle pixel groups are recorded on separate tracks in the multiple track set with corresponding color subcarrier cycle pixel groups in adjacent raster scan lines being recorded on separate tracks of the multiple track set; and wherein those pixel groups on a single track are processed through said Moviola relay formating and replication means which includes:

a format converter to present the Moviola color subcarrier cycle pixel groups on said single track in parallel format with each pixel being available from a separate output;

a first multiplexer to which the outputs from said format converter are applied, said first multiplexer being cycled to repeatedly pass each moviola subcarrier cycle pixel group a number of times equal to the number of tracks in the multiple track set; and a second multiplexer having a single output and a number of sequential inputs equal to the number of tracks in the multiple track set, said sequential inputs being arranged from a first input to a last input with each successive input therebetween interconnected through a delay of a duration equal to the duration of a color subcarrier cycle and with said first input having the output from said first multiplexer applied thereto, said second multiplexer being cycled through successive inputs by the horizontal sync signal so that upon being displayed each raster scan line is offset relative to adjacent raster scan lines with each repeated sequence of a color subcarrier cycle pixel group in a raster scan line being diagonally aligned with repeated sequences of color subcarrier cycle pixel groups in adjacent raster scan lines that do not correspond therewith.

12. In a record and replay system of the type wherein digital color composite video sampled at a predetermined multiple of the color subcarrier frequency is recorded with each video field or frame disposed on a set of multiple tracks and with only a portion of the recorded information being intended for replay to reconstruct the color video signal during the Moviola mode, the improvement comprising:

formating means for directing only pixel groups of entire subcarrier cycles to the individual tracks when recording; and replay formating and replication means for directing the moviola color subcarrier cycle pixel groups from the multiple track set and repeating each Moviola color subcarrier cycle pixel group a number of times to provide instantaneous coherent information during the Moviola mode.

13. The record and replay system of claim 12 wherein said record formating means includes:

a buffer memory for each track in the multiple track set;

a multiplexer through which sequential color subcarrier cycle pixel groups are separately passed to said buffer memories, said pixel groups being stored in said buffer memories during each cycle of said multiplexer and simultaneously read out to the tracks at the completion of each multiplexer cycle; and record format selector means for controlling said multiplexer to determine the entry order into said buffer memories of the sequential pixel groups.

14. The record system of claim 13 wherein said record format selector means controls said multiplexer through a modulo counter to record corresponding color subcarrier cycle pixel groups from each raster scan line in the same order on the tracks of the multiple track set, said modulo counter having a count equal to the number of tracks and having the horizontal sync signal applied to its reset input while the pixel clock is applied to its incrementing input through a divider that divides by a number equal to the number of pixels in each color subcarrier cycle pixel group.

15. The record system of claim 13 wherein said record format selector means controls said multiplexer through a read only memory programmed with the multiplexing sequence necessary to record corresponding color subcarrier cycle pixel groups in adjacent raster scan lines on separate tracks of the multiple track set, said read only memory having the horizontal sync signal applied thereto through a first modulo counter with a count equal to the number of tracks in the multiple track set and having the output applied thereto from a second modulo counter with a count equal to the number of tracks in the multiple track set, said second modulo counter having the horizontal sync signal applied to its reset input and the pixel clock applied to its incrementing input through a divider that divides by a number equal to the number of pixels in each color subcarrier cycle pixel group.

16. The record and replay system of claim 12 wherein sequential color subcarrier cycle pixel groups are recorded on separate tracks in the multiple track set with corresponding color subcarrier cycle pixel groups from each raster scan line being recorded in the same order on the tracks of the multiple track set; and wherein only those pixel groups on a single track are processed through said Moviola replay formating and replication means which includes:
- a format converter to present the Moviola color subcarrier cycle pixel groups on said single track in parallel format with each pixel being available from a separate output; and
- a multiplexer to which the outputs from said format converter are applied, said multiplexer being cycled to repeatedly pass each moviola color subcarrier cycle pixel group a number of times equal to the number of tracks in the multiple track set so that upon being displayed each repeated sequence of a color subcarrier cycle pixel group from a raster scan line is vertically aligned with the corresponding repeated sequence of color subcarrier cycle pixel groups from the other raster scan lines.

17. The system of claim 12 wherein sequential color subcarrier cycle pixel groups are recorded on separate tracks in the multiple track set with corresponding color subcarrier cycle pixel groups in adjacent raster scan lines being recorded on separate tracks of the multiple track set; and wherein those pixel groups on a single track are processed through said moviola replay formating and replication means which includes:
- a format converter to present the Moviola color subcarrier cycle pixel groups on said single track in parallel format with each pixel being available from a separate output;
- a first multiplexer to which the outputs from said format converter are applied, said first multiplexer being cycled to repeatedly pass each Moviola subcarrier cycle pixel group a number of times equal to the number of tracks in the multiple track set; and
- a second multiplexer having a single output and a number of sequential inputs equal to the number of tracks in the multiple track set, said sequential inputs being arranged from a first input to a last input with each successive input therebetween interconnected through a delay of a duration equal to the duration of a color subcarrier cycle and with said first input having the output from said first multiplexer applied thereto, said second multiplexer being cycled through successive inputs by the horizontal sync signal so that upon being displayed each raster scan line is offset relative to adjacent raster scan lines with each repeated sequence of a color subcarrier cycle pixel group in a raster scan line being diagonally aligned with repeated sequences of color subcarrier cycle pixel groups in adjacent raster scan lines that do not correspond therewith.

* * * * *